United States Patent
Stenqvist et al.

(10) Patent No.: US 11,795,885 B2
(45) Date of Patent: Oct. 24, 2023

(54) METHOD FOR CONTROLLING THE OPERATION OF AN ENGINE SYSTEM IN A VEHICLE UPON ENGINE START

(71) Applicant: VOLVO TRUCK CORPORATION, Gothenburg (SE)

(72) Inventors: Dan Stenqvist, Västra Frölunda (SE); Martin Wilhelmsson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/046,036

(22) Filed: Oct. 12, 2022

(65) Prior Publication Data

US 2023/0121839 A1    Apr. 20, 2023

(30) Foreign Application Priority Data

Oct. 19, 2021  (EP) ..................... 21203337

(51) Int. Cl.
 *F02D 41/02* (2006.01)
 *F01N 3/20* (2006.01)
(52) U.S. Cl.
 CPC .......... *F02D 41/0235* (2013.01); *F01N 3/208* (2013.01); *F01N 3/2066* (2013.01); *F01N 2610/02* (2013.01); *F01N 2610/1433* (2013.01); *F01N 2900/1602* (2013.01); *F02D 2200/0802* (2013.01)
(58) Field of Classification Search
 CPC .... F02D 41/0235; F01N 3/2066; F01N 3/208; F01N 2200/0802; F01N 2610/02; F01N 2610/1433; F01N 2900/1602
 See application file for complete search history.

(56) References Cited

U.S. PATENT DOCUMENTS

| 9,322,314 B2 * | 4/2016 | Hodgson ................... F01N 3/10 |
| 2010/0031639 A1 * | 2/2010 | Kwon ..................... F01N 3/208 60/297 |

(Continued)

FOREIGN PATENT DOCUMENTS

| DE | 102019205128 A1 | 4/2020 | |
| EP | 2447495 A1 * | 5/2012 | ............. F01N 3/208 |

(Continued)

OTHER PUBLICATIONS

Extended European Search Report in corresponding European Application No. 21203337.7 dated Apr. 12, 2022 (6 pages).

*Primary Examiner* — Audrey B. Walter
(74) *Attorney, Agent, or Firm* — Venable LLP; Jeffri A. Kaminski

(57) ABSTRACT

A method for controlling the operation of an engine system in a vehicle upon engine start. The engine system includes an engine and an exhaust aftertreatment system having a selective catalyst reduction, SCR, catalyst and a reductant dosing system for providing a reductant to the SCR catalyst. The method comprises: determining the temperature of the SCR catalyst; in response of determining that the temperature of the SCR catalyst is above a predetermined threshold, initiating pressurising of the reductant dosing system towards a predefined operating pressure; performing a preventive action for delaying engine start until the operating pressure of the reductant dosing system is reached.

15 Claims, 3 Drawing Sheets

(56) References Cited

U.S. PATENT DOCUMENTS

| | | | |
|---|---|---|---|
| 2013/0031890 A1* | 2/2013 | Shovels | ............... F01N 3/208 60/274 |
| 2013/0061576 A1 | 3/2013 | Gonze et al. | |
| 2016/0348555 A1* | 12/2016 | Tsuchiya | ............... F01N 3/208 |

FOREIGN PATENT DOCUMENTS

| | | | |
|---|---|---|---|
| EP | 3184769 A1 | 6/2017 | |
| WO | 16182895 A1 | 11/2016 | |

\* cited by examiner

METHOD FOR CONTROLLING THE OPERATION OF AN ENGINE SYSTEM IN A VEHICLE UPON ENGINE START

TECHNICAL FIELD

The present invention relates to a method for controlling the operation of an engine system in a vehicle upon engine start and to an exhaust aftertreatment system of an engine system in a vehicle. The invention further relates to a vehicle, a computer program, a compute readable medium and to a control unit.

BACKGROUND

A vehicle typically comprises an engine for propelling the vehicle. The engine may be an internal combustion engine powered by e.g. liquid or gaseous fuel, or it may be an electric machine powered by electricity. Moreover, hybrid solutions exist in which the vehicle is propelled both by an internal combustion engine and an electric machine.

In case the engine is a combustion engine, such as e.g. a diesel engine, it is common to provide the vehicle with an exhaust aftertreatment system, EATS, to handle emissions from the engine. An EATS for a diesel engine typically includes one or more of the following components: a diesel oxidation catalyst, DOC, a diesel particulate filter, DPF, and a selective catalytic reduction SCR catalyst. A reductant, such as urea or an ammonia comprising substance, is typically injected upstream of the SCR catalyst to assist in converting nitrogen oxides, also referred to as NOx, with the aid of a catalyst into diatomic nitrogen, N2, and water, and potentially carbon dioxide CO2 (depending on the choice of the reductant). The cleaned, or at least emission reduced, exhaust gases then leave the EATS and the vehicle through the tailpipe of the vehicle. Other types of engines causing at least partly similar emissions as the diesel engine may utilize the same, or a similar, EATS.

Government regulations, together with a constant demand for increased fuel economy of the vehicle, implies a need for a more efficient operation of the EATS. For example, it is desirable that the EATS heat up fast and have a high conversion efficiency also at very low loads, and at cold-start of the engine when the temperature of the exhaust gases is low. The need of very efficient engines for meeting stringent CO2-requirements also leads to lower temperature of the exhaust gases and higher engine out NOx-levels which requires large amounts of reductant to be injected upstream the SCR catalyst. Furthermore, when using urea as the reductant, the urea requires heat to evaporate and hydrolyse into ammonia. If the temperature is low, e.g. during cold-start of the engine, there is a large risk for creating crystallization and deposits that reduce the effect of the EATS.

Prior to engine start, the engine and/or the EATS, commonly referred to as an engine system, may be prepared for operation, or be preconditioned, in order to better handle the emissions from the exhaust gases. In some examples, the preparation or preconditioning of the engine system is performed by heating a component or sub-system of the engine system in order to increase the temperature thereof to be closer to its operating temperature prior to engine start in order to better handle the exhaust gases from the engine. Still, for at least some operational modes of the engine system, the heating of a component or a sub-system of the engine system is not sufficient for reducing the emissions from the exhaust gases, or at least not reducing the emissions to a sufficiently low level. There is thus a need in the industry for an improved control of the engine system to reduce emissions from the vehicle.

SUMMARY

It is an object of the present invention to at least partly alleviate the shortcomings discussed above in relation to known engine systems and provide an improved method for controlling the operating of the engine system upon engine start.

According to a first aspect of the present invention, a method for controlling the operation of an engine system in a vehicle upon engine start, the engine system comprising an engine and an exhaust aftertreatment system having a selective catalyst reduction, SCR, catalyst and a reductant dosing system for providing a reductant to the SCR catalyst, is provided. The method comprises:

determining the temperature of the SCR catalyst;
in response of determining that the temperature of the SCR catalyst is above a predetermined threshold, initiating pressurising of the reductant dosing system towards a predefined operating pressure,
performing a preventive action for delaying engine start until the operating pressure of the reductant dosing system is reached.

Hereby, the operating pressure of the reductant dosing system may be reached prior to engine start. The method may thus comprise pressuring the reductant dosing system to the predefined operating pressure of the reductant dosing system prior to engine start. Thus, upon engine start, the operating pressure of the reductant dosing system is already reached. Stated differently, the reductant dosing system may be preconditioned, or prepared, by being pressurised to its operating pressure prior to engine start, and by safeguarding the preconditioning/preparation by performing the preventive action for delaying engine start until the operating pressure of the reductant dosing system is reached. As a result, the reductant may be provided to the SCR catalyst by injecting the reductant shortly after, or immediate after, the engine start. Hereby, the operation of the SCR catalyst may be improved and a reduction of NOx emissions achieved. For example, the present method is less complex compared to a method in which the ammonia storage in the SCR catalyst is intentionally increased prior to engine start, as such measures typically requires a system for providing ammonia into the SCR catalyst when there is no flow of exhaust gases through the EATS.

According to at least one example embodiment, the predetermined threshold of the temperature of the SCR catalyst corresponds to a relatively high temperature of the SCR catalyst, e.g. within 100° C. of the operating temperature of the SCR catalyst. The relatively high temperature of the SCR catalyst may e.g. be a result of a previous drive cycle. That is, the temperature of the SCR catalyst has decreased somewhat from its operating temperature of the previous drive cycle, but not enough to be below the predetermined threshold. For example, such scenario may occur for a hybrid vehicle comprising an electric machine in addition to the engine, and when the engine has been shut off and the vehicle has been operated with the electric machine for a time-period. Such relatively high temperature of the SCR catalyst typically entails a relatively low buffer of ammonia storage in the SCR catalyst. By performing a preventive action for delaying engine start until the operating pressure of the reductant dosing system is reached, a quick increase of the ammonia storage in the SCR catalyst can be achieved upon engine start. Hereby, the engine may be operated in an engine mode resulting in a better fuel economy, e.g. an engine mode related to high engine out NOx. Thus, the method may be referred to as a method for NOx emission control in a vehicle upon intended start of the engine.

According to at least one example embodiment, the predetermined threshold of the temperature of the SCR catalyst is set to be at least within 100° C., or at least within 150° C., or at least within 200° C., of the operating temperature of the SCR catalyst.

Hereby, the temperature of the SCR catalyst is relatively warm, and the preventive action for delaying engine start until the operating pressure of the reductant dosing system is reached, is effectively utilised. According to at least one example embodiment, the method comprises comparing the determined temperature of the SCR catalyst with the predetermined threshold. Hereby, it can be easily established whether the temperature of the SCR catalyst is above the predetermined threshold or not.

According to at least one example embodiment, the predetermined threshold of the temperature of the SCR catalyst is 100° C., or 150° C., or 200° C.

It should be understood that the predefined operating pressure of the reductant dosing system is a predetermined operating pressure, typically referring to the normal operating pressure, or the pressure of the reductant dosing system at normal operation. Thus, the reductant dosing system is configured to be operated at the predefined operating pressure. Throughout the text, the predefined operating pressure of the reductant dosing system is sometimes simply referred to as the operating pressure for increased comprehensibility.

According to at least one example embodiment, the method comprises determining the pressure of the reductant dosing system, comparing the determined pressure with the predefined operating pressure, and in response of determining that the pressure of the reductant dosing system is below the predefined operating pressure, initiating pressurising of the reductant dosing system. Hereby, a procedure for determining when the predefined operating pressure of the reductant dosing system is reached is provided.

According to at least one example embodiment, performing a preventive action comprises preventing the engine to start. Hereby, the engine is prevented from being started until the operating pressure of the reductant dosing system is reached. Thus, a reliable preventive action for delaying engine start is provided. As mentioned above, the method may be applicable for a hybrid vehicle comprising an electric machine in addition to the engine for propelling the vehicle. Hereby, the step of performing a preventive action of preventing the engine to start may be carried out simultaneously with operating the electric machine to propel the vehicle.

According to at least one example embodiment, performing a preventive action comprises generating a signal with instructions informing the driver to delay starting the engine. Hereby, the driver is informed to delay start of the engine until the operating pressure of the reductant dosing system is reached. Thus, the driver may be given the choice of starting the engine or not, even if the operating pressure of the reductant dosing system is not reached. Typically, the driver may still start the engine if it is more desirable to quickly start the engine than reaching the operating pressure of the reductant dosing system prior to engine start. The signal may e.g. be generated upon initiating pressurising of the reductant dosing system towards the operating pressure. The driver may e.g. be informed by a speaker voice informing the driver to delay starting the engine, or be informed by information on a display, or a screen.

According to at least one example embodiment, the method comprises permitting engine start once the operating pressure of the reductant dosing system is reached.

Thus, once the predefined operating pressure of the reductant dosing system is reached, the preventive action for delaying engine start is cancelled, or set to be in void. For example, in case the preventive action comprises preventing the engine to start, the engine is permitted to start once the operating pressure of the reductant dosing system is reached. For example, in case the preventive action comprises generating a signal with instructions informing the driver to delay starting the engine, the signal is cancelled. According to at least one example embodiment, the method comprises initiating cold start on board diagnostics and/or on-board monitoring once the engine is started.

According to at least one example embodiment, the reductant dosing system comprises a pressurising device, wherein pressurising the reductant dosing system is performed by means of the pressurising device. Hereby, a reliable way of pressurising the reductant dosing system is provided. For example, the pressurising device is a dosing pump.

According to at least one example embodiment, the exhaust aftertreatment system further comprises a temperature sensor arranged to measure the temperature of the SCR catalyst, wherein determining the temperature of the SCR catalyst is performed by means of the temperature sensor. Hereby, a reliable way of determining the temperature of the SCR catalyst is provided. For example, the temperature sensor may be arranged in, or in close proximity to, the SCR catalyst. According to at least one example embodiment, the temperature sensor is arranged adjacent upstream, inside, or adjacent downstream of the SCR catalyst.

According to at least one example embodiment, the method comprises injecting reductant from the reductant dosing system within 5 seconds upon engine start. Thus, by performing the preventive action for delaying engine start until the predefined operating pressure of the reductant dosing system is reached, the reductant dosing system is ready to inject the reductant at least within 5 seconds after the engine is started. Hereby, a quick increase of the ammonia storage in the SCR catalyst can be achieved soon after engine start. According to at least one example embodiment, the method comprises injecting reductant from the reductant dosing system within 3 seconds upon engine start.

According to a second aspect of the invention, an exhaust aftertreatment system of an engine system in a vehicle is provided. The exhaust aftertreatment system comprises:
- a selective catalyst reduction, SCR, catalyst,
- a reductant dosing system for providing a reductant to the SCR catalyst, the reductant dosing system comprising a pressurising device configured to pressurize the reductant dosing system up to at least a predefined operating pressure, and
- a control unit configured to acquire the temperature of the SCR catalyst, and in response of determining that the temperature of the SCR catalyst is above a predetermined threshold, initiating pressurising of the reductant dosing system towards a predefined operating pressure, and configured to perform a preventive action for delaying engine start until the operating pressure of the reductant dosing system is reached.

Effects and features of the second aspect of the invention are largely analogous to those described above in connection with the first aspect of the invention. Embodiments mentioned in relation to the first aspect of the invention are largely compatible with the second aspect of the invention, of which some are exemplified below typically without repeating the corresponding advantageous effects. Thus, the control unit is configured to perform the preventive action for delaying engine start until the operating pressure of the reductant dosing system is reached.

According to at least one example embodiment, the control unit is configured to prevent engine start, and/or to generate a signal with instructions informing the driver to delay starting the engine, until a predefined operating pressure of the reductant dosing system is reached.

According to at least one example embodiment, the exhaust aftertreatment system further comprises a temperature sensor arranged to measure the temperature of the SCR catalyst. The control unit may be configured to acquire the temperature of the SCR catalyst by receiving the measured temperature from the temperature sensor.

According to at least one example embodiment, the control unit is configured to initiate reductant injection from the reductant dosing system within 5 seconds upon engine start. For example, the control unit may be configured to control a reductant injector of the reductant dosing system.

According to a third aspect of the invention, a vehicle comprising an exhaust aftertreatment system according to the second aspect of the invention is provided. According to at least one example embodiment, the vehicle comprises an electric machine configured to propel the vehicle in addition to the engine. According to at least one example embodiment, the electric machine is configured to propel the vehicle when the engine is shut-off, or when the engine is prevented from being started.

According to a fourth aspect of the invention, a computer program comprising program code means for performing the method, or the steps, of the first aspect of the invention when said program is run on a computer is provided. Thus, the program code means comprises instructions to cause the EATS of the second aspect of the invention, to execute at least some of the steps of the method according to the first aspect of the invention. For example, the program code means comprises instructions to cause the temperature sensor to measure the temperature of the SCR catalyst, and instructions to perform the preventing action for delaying engine start, e.g. by sending such instructions to a control unit of the engine or to a driver display of the vehicle.

According to a fifth aspect of the invention, a computer readable medium carrying a computer program comprising program code means for performing the method, or the steps, of the first aspect of the invention when said computer program is run on a computer is provided. For example, the program code means comprises instructions to cause the temperature sensor to measure the temperature of the SCR catalyst, and instructions to perform the preventing action for delaying engine start, e.g. by sending such instructions to a control unit of the engine or to a driver display of the vehicle.

According to a sixth aspect of the invention, a control unit for controlling the operation of an engine system in a vehicle upon engine start is provided. The control unit is configured to perform the method, or the steps, of the first aspect of the invention. Thus, the control unit may be configured to acquire the temperature of the SCR catalyst, e.g. by receiving a measured temperature of the temperature sensor. Thus, the control unit may be configured to control or operate the temperature sensor. Moreover, the control unit may be configured to performing a preventive action for delaying engine start. Thus, the control unit is typically configured to operate a control unit of the engine or to operate a driver display of the vehicle. Stated differently, the control unit may be configured to instruct the EATS or the engine system to perform at least some steps of the method of the first aspect of the invention.

Effects and features of the third to sixth aspects of the invention are largely analogous to those described above in connection with the first aspect of the invention. Embodiments mentioned in relation to the first and second aspects of the invention are largely compatible with the third to sixth aspects of the invention. Thus, the engine system typically comprises an engine and an exhaust aftertreatment system having a selective catalyst reduction, SCR, catalyst and a reductant dosing system for providing a reductant to the SCR catalyst.

The order of the method steps described in the first aspect of the invention is not constrained to that described in the present disclosure. One or several of the steps could switch places, or occur in a different order, unless explicitly stated so without departing from the scope of the invention. However, according to at least one example embodiment, the method steps are performed in the order described in the first aspect of the invention.

According to at least one example embodiment, applicable to any one of the first to sixth aspects of the invention, the EATS of the engine system is configured for converting NOx emissions in the exhaust gases from an engine of a vehicle, e.g. a heavy duty truck. The EATS may be used for cleaning exhaust gases from various types of engines, such as e.g. engines using diesel, petrol, hydrogen or gaseous fuels as fuel. For example, the present EATS may be used to clean exhaust gases by converting NOx emissions from the exhausts of internal combustion engines using diesel, petrol, CNG (Compressed Natural Gas), LPG (Liquified Pressurized Gas), DME (DiMethylEther), and/or H2 (Hydrogen) as fuel.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
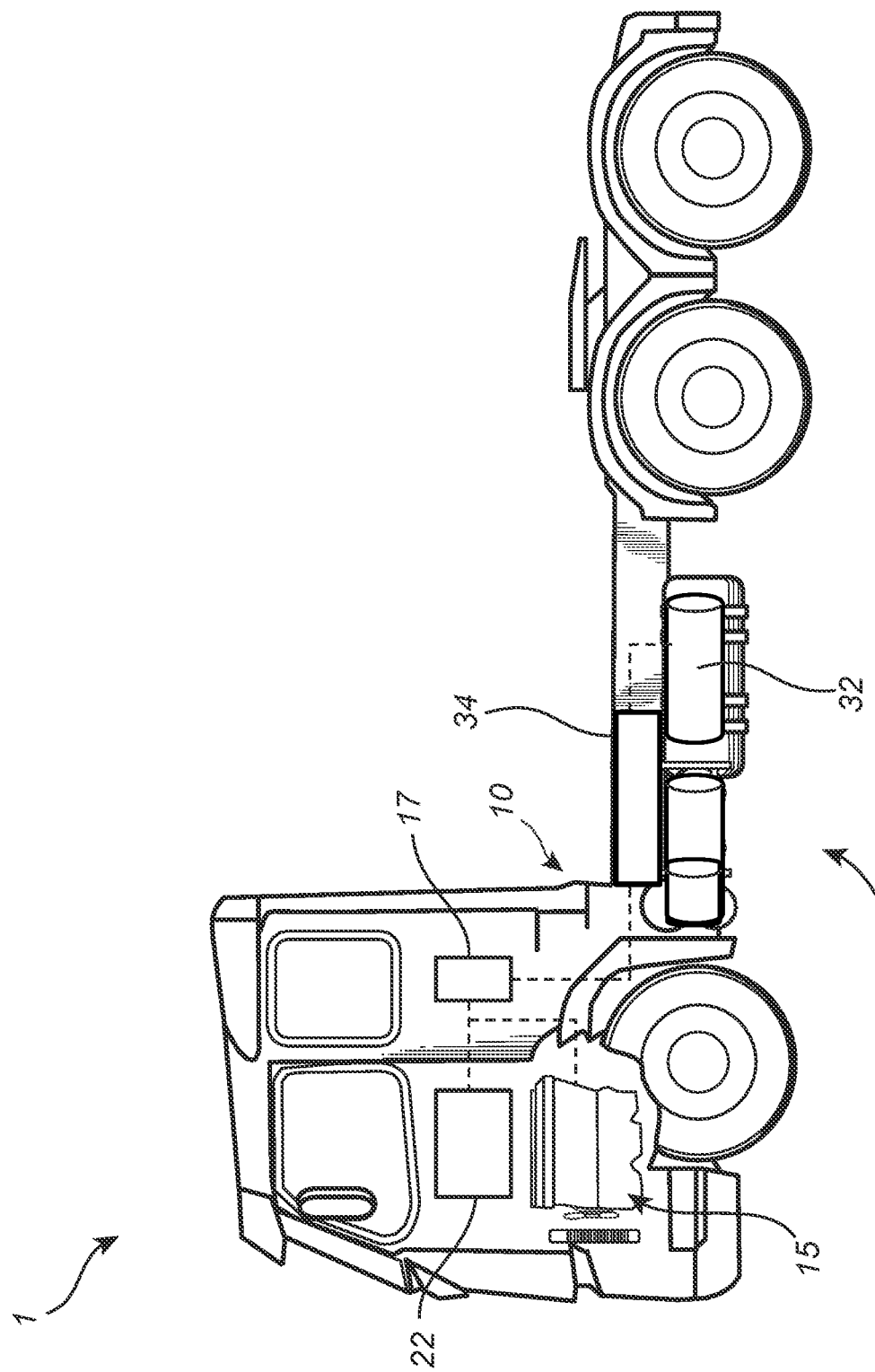
FIG. 1 is a schematic side view of a vehicle comprising an engine system, and an exhaust aftertreatment system of the engine system, in accordance with an example embodiment of the invention.

With reference to FIG. 1 a vehicle 1, here embodied as a heavy duty truck 1, comprising an engine system 10 is disclosed for which an EATS 20 of a kind disclosed in the present disclosure is advantageous. However, the EATS 20 may as well be implemented in other types of vehicles, such as in busses, light-weight trucks, passenger cars, marine applications etc having similar engine systems. The vehicle 1 of FIG. 1 is a hybrid vehicle 1 comprising an engine 15, which in this embodiment is a diesel engine 15, and an electric machine 22. The diesel engine 15 is powered by diesel fuel, typically comprised in a fuel tank (not shown) and the electric machine 22 is powered by electricity supplied from at least one energy storage or transformation device, e.g. a battery or a fuel cell. The diesel engine 15 and the electric machine 22 are typically arranged and configured to individually propel the vehicle 1, by being separately coupled to other parts of the powertrain of the vehicle 1, such as transmission, drive shafts and wheels (not shown in detail). That is, the vehicle 1 may be propelled by the diesel engine 15 alone, the electric machine 22 alone, or by the diesel engine 15 together with the electric machine 22. Moreover, the vehicle 1 comprises a control unit 17 configured to control the operation of the engine system 10 as will be described in more detail later in the text.

In FIG. 1, at least the diesel engine 15 is comprised in the engine system 10, the engine system 10 further comprising the EATS 20 having at least an SCR catalyst 32. The SCR catalyst 32 is arranged and configured to convert nitrogen oxides, also referred to as NOx, with the aid of a catalyst, into diatomic nitrogen, N2, and water, H2O, and potentially carbon dioxide, CO2. The EATS 20 further comprises a reductant dosing system 34 configured to provide a reductant, typically anhydrous ammonia, aqueous ammonia or urea solution (commonly referred to as reductant in the present disclosure), to the SCR catalyst. Hereby, the reductant can be absorbed onto the catalyst in the SCR catalyst 32. The engine system 10, and the EATS 20 of the engine system 10, is described in more detail with reference to FIG. 2.

Figure 2:
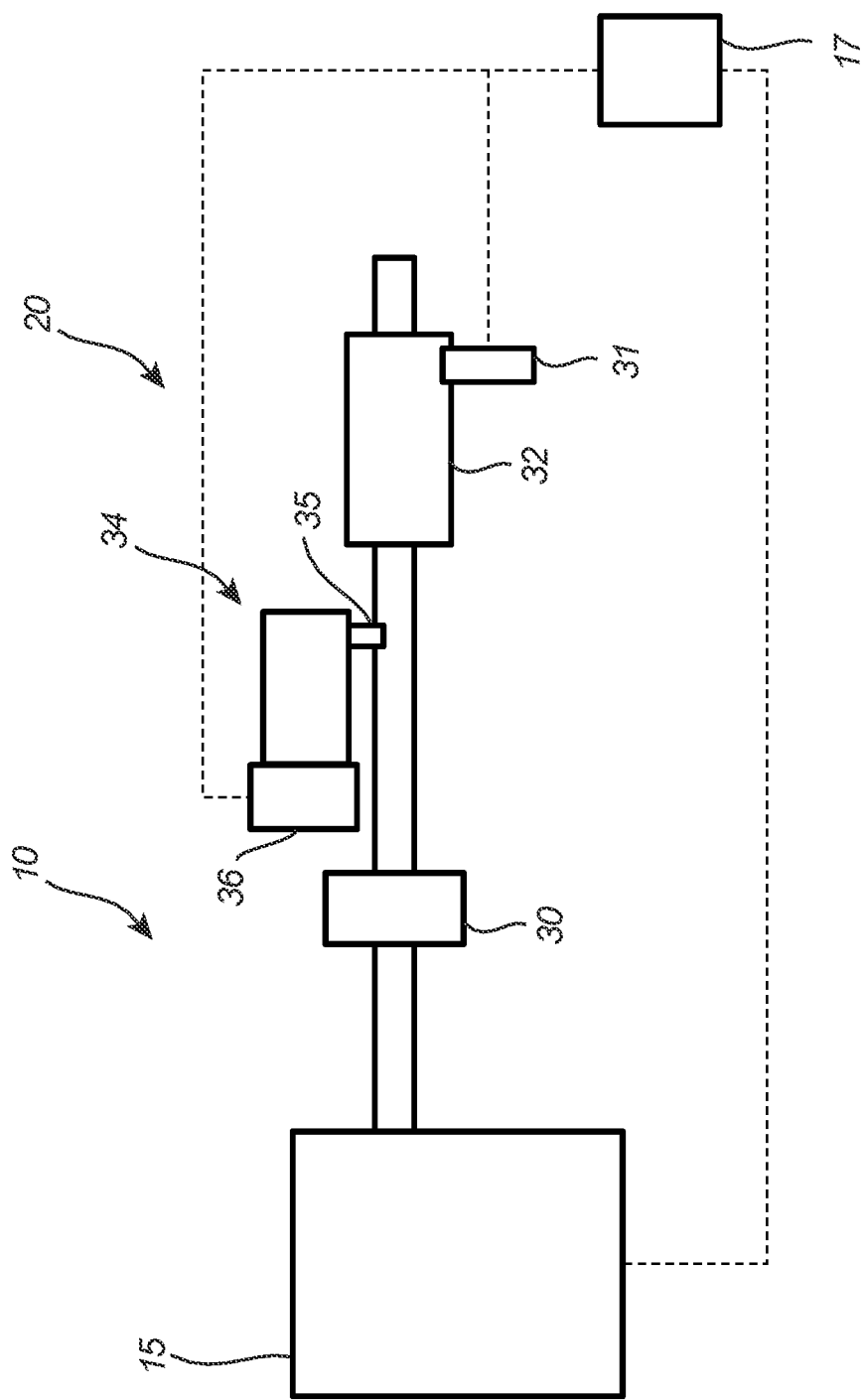
FIG. 2 is a schematic view of an engine system, and an exhaust aftertreatment system of the engine system, of a vehicle in accordance with example embodiments of the invention.

FIG. 2 discloses the engine system 10 of vehicle 1 of FIG. 1 in more detail. The engine system 10 comprises, as already described with reference to FIG. 1, a diesel engine 15 and an EATS 20 having an SCR catalyst 32 and a reductant dosing system 34, and a control unit 17 which is configured to control the operation of the engine system 10. It should however be mentioned that the control unit 17 may be provided outside of the engine system 10 and instead being comprised in another part of the vehicle. The reductant dosing system 34 of FIG. 2 comprises a pressurising device 36 in the form of a dosing pump which is configured to pressurize the reductant in the reductant dosing system 34 up to at least a predefined operating pressure. That is, the reductant is typically held within a closed container of the reductant dosing system 34, and the pressurising device 36 is configured to pressurise the reductant in the closed container to the predefined operating pressure. The reductant dosing system 34 may further comprise an injector 35 configured to inject the pressurised reductant upstream of the SCR catalyst 32 for providing the reducing agent, typically ammonia, to the SCR catalyst 32 for the conversion of NOx as previously described. The EATS 20 of FIG. 2 further comprises a temperature sensor 31 arranged to measure the temperature of the SCR catalyst 32. The engine system 10 may optionally comprise one or more emission reducing modules 30, being e.g. an oxidation catalyst, which in this embodiment is a diesel oxidation catalyst, DOC, and/or a particulate filter, which in this embodiment is a diesel particulate filter, DPF. The emission reducing module 30 is in the embodiment of FIG. 2 arranged upstream of the SCR catalyst 32.

Upon engine start and during the initial operation of engine system 10, e.g. up to a point in time at which the operating conditions of the engine system 10 has been reached, the emissions (e.g. emissions per travelled distance, or emissions per unit operational time) out of the EATS 20 are typically higher compared to when the operating conditions of the engine system 10 has been reached. Such emissions may be referred to as cold-start emissions and they typically comprise undesired compounds (such as NOx, particles, and CO or unburned HC) in the exhaust out from the EATS 20. The initial operation of the engine system 10 may be defined by a time span subsequent to engine start, e.g. a short time span of 0 s (or 1 s) to 30 s, or a longer time span of 0 s (or 1 s) to 10 min or 15 min. In order to avoid, or at least reduce, such cold-start emissions, at least a part of the engine system 10 may be prepared prior to engine start. That is, at least a part of the engine system 10 may be prepared in such a way that the emissions during the initial operation of the engine system 10 is reduced.

The control unit 17 of the vehicle 1 is configured to control the operation of the engine system 10. In more detail, the control unit 17 is configured to acquire or receive information about the temperature of the SCR catalyst 32, typically from the temperature sensor 31, and in response of determining that the temperature of the SCR catalyst is above a predetermined threshold, initiating pressurising of the reductant dosing system 34 towards the predefined operating pressure, typically by means of the pressuring device 36. Moreover, the control unit 17 is configured to perform a preventive action for delaying engine start until the operating pressure of the reductant dosing system 34 is reached. Thus, the control unit 17 may control the engine system 10 by pressurising the reductant dosing system 34 to the predefined operating pressure prior to engine start by performing the preventive action and by initiating pressurising by means of the pressurising device 36. Thus, upon engine start, the operating pressure of the reductant dosing system 34 may already be reached. Typically, the control unit 17 is configured to prevent engine start, and/or is configured to generate a signal with instructions informing the driver to delay starting the engine 15, until the predefined operating pressure of the reductant dosing system 34 is reached. Moreover, the control unit 17 is typically configured to control the injection of reductant from the reductant dosing system 34 via the injector 35. For example, the control unit 17 is configured to initiate injection of reductant within 5 seconds of the engine start.

As described with reference to FIG. 1, the engine system 10 may comprise an electric machine 22 powered by electricity supplied from at least one energy storage or transformation device, e.g. a battery or a fuel cell. By propelling the vehicle 1 using different drive cycles, the emissions out of the EATS may vary. For example, the vehicle 1 may be operated by three subsequent drive cycles being a first drive cycle in which the diesel engine 15 is operated to propel the vehicle 1, possibly together with the electric machine, and a second drive cycle in which the diesel engine 15 is shut-off and only the electric machine is operated to propel the vehicle 1 (or the electric machine 22 is also shut-off and the vehicle is at stand-still), and a third drive cycle in which the diesel engine 15 is re-started in order to propel the vehicle 1. Between the second and third drive cycles, the temperature of the EATS 20, and in particular the temperature of the SCR catalyst 32, will begin to decrease below its operating temperature. However, as long as the temperature of the SCR catalyst 32 is not dropped below the predetermined threshold of the temperature of the SCR catalyst 32, external heating of the SCR catalyst 32 may not be necessary, but instead quickly increasing the ammonia storage in the SCR catalyst 32 by the procedure described above is enough. However, according to at least one example embodiment, the EATS comprises a heater, e.g. an electrical heating element, configured to heat the SCR catalyst 32 prior to engine start. For example, the control unit 17 may be configured to control the temperature of the SCR catalyst 32 prior engine start by means of the heater. Preferably, the predetermined threshold of the temperature of the SCR catalyst 32 corresponds to a relatively high temperature, e.g. within 100° C. of the operating temperature of the SCR catalyst 32. Such relatively high temperature of the SCR catalyst 32 typically entails a relatively low buffer of ammonia storage in the SCR catalyst 32. By performing the preventive action for delaying engine start until the operating pressure of the reductant dosing system 34 is reached, a quick increase of the ammonia storage in the SCR catalyst 32 can be achieved upon engine start. Hereby, the engine 15 may be operated in an engine mode resulting in a better fuel economy, e.g. an engine mode related to high engine out NOx.

Figure 3:
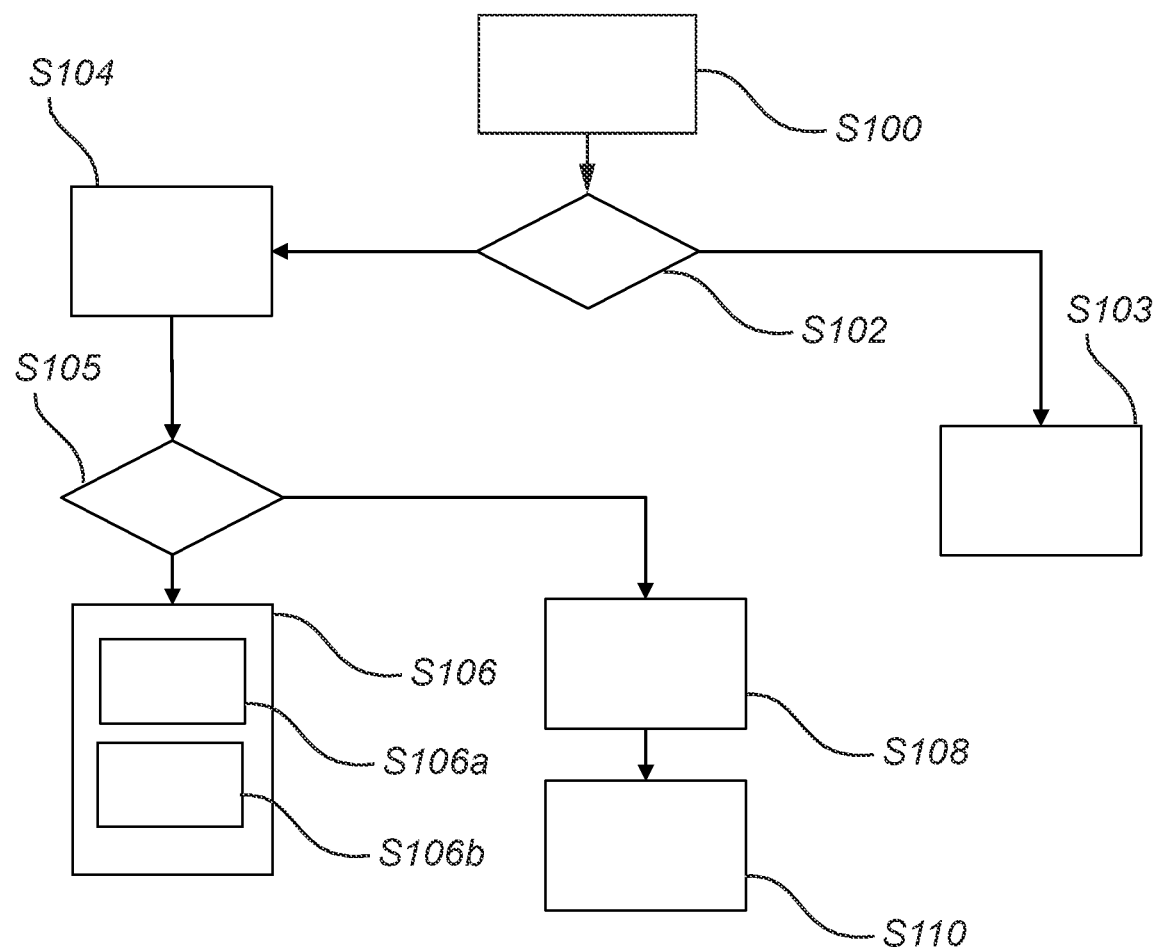
FIG. 3 is a flowchart illustrating the steps of a method in accordance with example embodiments of the invention.

Turning to the flowchart of FIG. 3, schematically illustrating steps of a method for controlling the operation of an engine system 10 in a vehicle 1 upon engine start, such as the engine system 10 of FIGS. 1 and 2. Thus, the engine system 10 comprises at least an engine 15 and an EATS 20 having an SCR catalyst 32 and a reductant dosing system 34 for providing a reductant to the SCR catalyst 32.

In a step S100, e.g. being a first step S100, the temperature of the SCR catalyst is determined. As described with reference to FIG. 2, the EATS may comprise a temperature sensor arranged to measure the temperature of the SCR catalyst, wherein the step of determining the temperature of the SCR catalyst S100 is performed by means of the temperature sensor.

In a step S102, e.g. being a second step S102, it is determined whether or not the determined temperature of the SCR catalyst is above the predetermined threshold, and in response of determining that the temperature of the SCR catalyst is above a predetermined threshold, performing a step S104, e.g. being a third step S104, of initiating pressurising of the reductant dosing system towards a predefined operating pressure. Typically, the step S102 comprises the sub-step of comparing the determined temperature of the SCR catalyst with a predetermined threshold of the SCR catalyst temperature.

In an optional step S105, e.g. being a fourth step S105, it is determined whether or not the pressure of the reductant dosing system is below the predefined operating pressure.

In a step S106, being e.g. a fifth step S106, a preventive action for delaying engine start until the operating pressure of the reductant dosing system is reached is performed. Thus, the step of performing a preventive action for delaying engine start S106 may be performed in response of determining that the pressure of the reductant dosing system is below the predefined operating pressure of the optional step S105. Typically, the step of performing a preventive action for delaying engine start S106 is performed simultaneously with continued pressurising of the reductant dosing system until the predefined operating pressure is reached. As described with reference to FIG. 2, the reductant dosing system may comprise a pressurising device, wherein pressurising the reductant dosing system is performed by means of the pressurising device.

As seen in FIG. 3, the step of performing a preventive action for delaying engine start S106 may be performed by at least two different options, wherein a first option S106a comprises preventing the engine to start, and a second option S106b comprises generating a signal with instructions informing the driver to delay starting the engine.

In a step S108, being e.g. a sixth step S108, engine start is permitted once the operating pressure of the reductant dosing system is reached. Thus, the step of permitting engine start 108 may be performed in response of determining that the pressure of the reductant dosing system is equal to, or above, the predefined operating pressure of the optional step S105. The step of permitting engine start 108 may further comprise the step of automatically or manually starting the engine.

In a step S110, being e.g. a seventh step S110, reductant may be injected from the reductant dosing system within 5 seconds upon engine start. That is, imminent of or shortly after engine start, the reductant dosing system is ready to be used (i.e. the operating pressure of the reductant dosing system is reached), and may thus inject reductant for the SCR catalyst.

In an optional step S103, being e.g. an optional third step S103, performed in response of determining that the temperature of the SCR catalyst is below the predetermined threshold, no pressurising of the reductant dosing system towards a predefined operating pressure is allowed to be initiated. As an alternative, the optional third step S103 comprises heating the SCR catalyst and returning to the first step of determining the temperature of the SCR catalyst S100.

It is to be understood that the present invention is not limited to the embodiments described above and illustrated in the drawings; rather, the skilled person will recognize that many changes and modifications may be made within the scope of the appended claims. For example, the exhaust aftertreatment unit may be used for cleaning exhaust gases of other engines than diesel engines. For example, the present exhaust aftertreatment unit may be used to clean exhaust gases, e.g. by converting NOx emissions, from the exhaust of internal combustion engines using petrol, CNG (Compressed Natural Gas), LPG (Liquified Pressurized Gas), DME (DiMethylEther), and/or H2 (Hydrogen) as fuel. Thus, the engine system may comprise another combustion engine than a diesel engine, e.g. a hydrogen engine.

It should be noted that the naming of the steps of FIG. 3 is not necessarily, but might according to at least one example embodiment, relate to the order in which the steps are carried out. Thus, the order of the steps may be different than that explained here, unless explicitly being dependent on each other. Moreover, one or more steps may be omitted, and/or two of the steps may be carried out simultaneously.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for controlling the operation of an engine system in a vehicle upon engine start, the engine system comprising an engine and an exhaust aftertreatment system having a selective catalyst reduction, SCR, catalyst and a reductant dosing system for providing a reductant to the SCR catalyst, the method comprising:
   determining the temperature of the SCR catalyst;
   in response of determining that the temperature of the SCR catalyst is above a predetermined threshold, initiating pressurising of the reductant dosing system towards a predefined operating pressure;

performing a preventive action for delaying engine start until the operating pressure of the reductant dosing system is reached.

2. The method according to claim 1, wherein performing a preventive action comprises preventing the engine to start.

3. The method according to claim 1, wherein performing a preventive action comprises generating a signal with instructions informing the driver to delay starting the engine.

4. The method according to claim 1, comprising permitting engine start once the operating pressure of the reductant dosing system is reached.

5. The method according to claim 1, wherein the reductant dosing system comprises a pressurising device, and wherein pressurising the reductant dosing system is performed by means of the pressurising device.

6. The method according to claim 1, wherein the exhaust aftertreatment system further comprises a temperature sensor arranged to measure the temperature of the SCR catalyst, wherein determining the temperature of the SCR catalyst is performed by means of the temperature sensor.

7. The method according to claim 1, comprising injecting reductant from the reductant dosing system within 5 seconds upon engine start.

8. A computer program comprising program code for performing the steps of claim 1 when said program is run on a computer.

9. A computer readable medium carrying a computer program comprising program code for performing the steps of claim 1 when said computer program is run on a computer.

10. A control unit for controlling the operation of an engine system in a vehicle upon engine start, the control unit being configured to perform the steps of the method according to claim 1.

11. An exhaust aftertreatment system of an engine system in a vehicle, comprising:
a selective catalyst reduction, SCR, catalyst;
a reductant dosing system for providing a reductant to the SCR catalyst, the reductant dosing system comprising a pressurising device configured to pressurize the reductant dosing system up to at least a predefined operating pressure; and
a control unit configured to acquire the temperature of the SCR catalyst, and in response of determining that the temperature of the SCR catalyst is above a predetermined threshold, initiating pressurising of the reductant dosing system towards a predefined operating pressure, and configured to perform a preventive action for delaying engine start until the operating pressure of the reductant dosing system is reached.

12. The exhaust aftertreatment system according to claim 11, wherein the control unit is configured to prevent engine start, and/or to generate a signal with instructions informing the driver to delay starting the engine, until a predefined operating pressure of the reductant dosing system is reached.

13. The exhaust aftertreatment system according to claim 11, further comprising a temperature sensor arranged to measure the temperature of the SCR catalyst.

14. The exhaust aftertreatment system according to claim 11, wherein the control unit is configured to initiate reductant injection from the reductant dosing system within 5 seconds upon engine start.

15. A vehicle comprising an exhaust aftertreatment system according to claim 11.

* * * * *